(12) United States Patent
Huang et al.

(10) Patent No.: US 11,171,740 B2
(45) Date of Patent: Nov. 9, 2021

(54) TRANSCEIVER AND OPERATION METHOD OF THE SAME

(71) Applicant: REALTEK SEMICONDUCTOR CORPORATION, Hsinchu (TW)

(72) Inventors: Liang-Wei Huang, Hsinchu (TW); Yu-Xuan Huang, Hsinchu (TW); Huan-Chung Chen, Hsinchu (TW); Chia-Lin Chang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/874,307

(22) Filed: May 14, 2020

(65) Prior Publication Data

US 2021/0218497 A1 Jul. 15, 2021

(30) Foreign Application Priority Data

Jan. 9, 2020 (TW) .................................. 109100755

(51) Int. Cl.
*H04B 3/23* (2006.01)
*H04L 1/00* (2006.01)

(52) U.S. Cl.
CPC ........... *H04L 1/0053* (2013.01); *H04B 3/235* (2013.01); *H04L 1/0021* (2013.01)

(58) Field of Classification Search
CPC ..... H04L 1/0053; H04L 1/0021; H04B 3/235; H04B 3/20; H04B 7/015
See application file for complete search history.

(56) References Cited

U.S. PATENT DOCUMENTS

| 5,271,060 A * | 12/1993 | Moran, III | H04B 1/586 379/340 |
| 7,139,342 B1 * | 11/2006 | Phanse | H04B 3/23 375/350 |
| 8,670,555 B2 * | 3/2014 | Huang | H04B 3/238 379/406.1 |
| 2005/0099966 A1 * | 5/2005 | Huang | H04B 3/23 370/286 |
| 2008/0151787 A1 * | 6/2008 | Lin | H04B 3/23 370/276 |

(Continued)

FOREIGN PATENT DOCUMENTS

EP 1083675 A2 3/2001

*Primary Examiner* — Sophia Vlahos
(74) *Attorney, Agent, or Firm* — WPAT, P.C., Intellectual Property Attorneys; Anthony King

(57) ABSTRACT

The present invention provides a transceiver. The transistor is coupled to a transmission line. The transceiver includes a variable resistor set, a transmitter module, a receiver module, and a digital signal processor. The transmitter module has an output terminal coupled to the variable resistor set and the transmission line. The transmitter module includes a first digital-to-analog converter configured to output an emission current. The receiver module has an input terminal coupled to the transmitter module and the transmission line. When the emission current is fed into the transmission line, a far-end echo is fed into the receiver module. An amplitude of the far-end echo is associated with a resistance value of the transmission line. The digital signal processor adjusts a current value of the emission current from a first default current value to a second default current value based on the amplitude of the far-end echo.

20 Claims, 2 Drawing Sheets

(56) References Cited

U.S. PATENT DOCUMENTS

| | | | |
|---|---|---|---|
| 2010/0029217 A1* | 2/2010 | Liu | H04W 52/246 |
| | | | 455/73 |
| 2010/0208577 A1* | 8/2010 | Huang | H04B 3/23 |
| | | | 370/201 |
| 2012/0317608 A1 | 12/2012 | Chu et al. | |
| 2019/0245673 A1* | 8/2019 | Lin | H04L 5/1461 |

* cited by examiner

TRANSCEIVER AND OPERATION METHOD OF THE SAME

TECHNICAL FIELD

The present application relates generally to a transceiver and operation method of the same; in particularly, to a transceiver using a lookup table to provide current and operation method of the same.

BACKGROUND

In high-speed Ethernet applications, paired transceiver and transmission line are often used. One end of the transmission line is connected to a transceiver, while the other end is connected to another transceiver. Regarding the connection between the transceiver and the transmission line, one should consider the impedance matching between the transmission line and the transceiver, as well as whether values of electrical characteristics provided by the transceiver meets a default value. Values of electrical characteristics provided by existing transmitters often fail to meet a default value, which causes transmission issues. In order to solve the transmission problem, how to achieve the impedance matching and make values of electrical characteristics meet a default value have become an important task.

BRIEF SUMMARY OF THE INVENTION

In view of the foregoing, the purpose of some embodiments of the present invention is to provide a transceiver and operation method of the same; in particularly, to a transceiver using a lookup table to provide current and operation method of the same to address the above-mentioned technical issues.

Embodiments of the present invention provide a transceiver, coupled to a transmission line, the transceiver including: a variable resistor set; a transmitter module, having an output terminal coupled to the variable resistor set and the transmission line, the transmitter module including: a first digital-to-analog converter configured to output an emission current; a receiver module, having an input terminal coupled to the transmitter module and the transmission line, wherein when the emission current is fed into the transmission line, a far-end echo is fed into the receiver module, an amplitude of the far-end echo is associated with a resistance value of the transmission line; and a digital signal processor, coupled to the transmitter module and the receiver module, wherein the digital signal processor adjusts a current value of the emission current from a first default current value to a second default current value based on the amplitude of the far-end echo.

Embodiments of the present invention provide a method for operating a transceiver, the method including: outputting an emission current, wherein when the emission current is fed into a transmission line coupled to the transceiver, a far-end echo is caused and fed into a receiver module of the transceiver, and an amplitude of the far-end echo is associated with a resistance value of the transmission line; and adjusting a current value of the emission current from a first default current value to a second default current value based on the amplitude of the far-end echo.

The present transceiver can obtain a corresponding current value from a pre-determined lookup table based on a resistance value of a transmission line, and make a transmitter module of the transceiver provide a current having the corresponding current value, wherein a portion of the current flows into the transmission line. Therefore, it is feasible to keep a voltage across the transmission line an output voltage of the transceiver) at a fixed value, or within an acceptable error range, so as to improve transmission quality.

DETAILED DESCRIPTION

In high-speed Ethernet applications, paired transceiver and transmission line are often used. A resistance value of the transmission line affect an output voltage of the transceiver. For example, due to factors such as process variation of the transmission line or aging of the transmission line, the resistance value of the transmission line is no longer a default optimal resistance value, e.g., 50 ohms. In this case, if a transmitter module of the transceiver still provides an emission current having a default current value corresponding to the optimal resistance value, the output voltage of the transceiver can no longer meet a default voltage value. The present transceiver can adaptively provide a current having an adequate current value based on the resistance value of the transmission line. Therefore, it is feasible to keep a voltage across the transmission line the output voltage of the transceiver) at a fixed value, or within an acceptable error range, so as to improve transmission quality.

Figure 1:
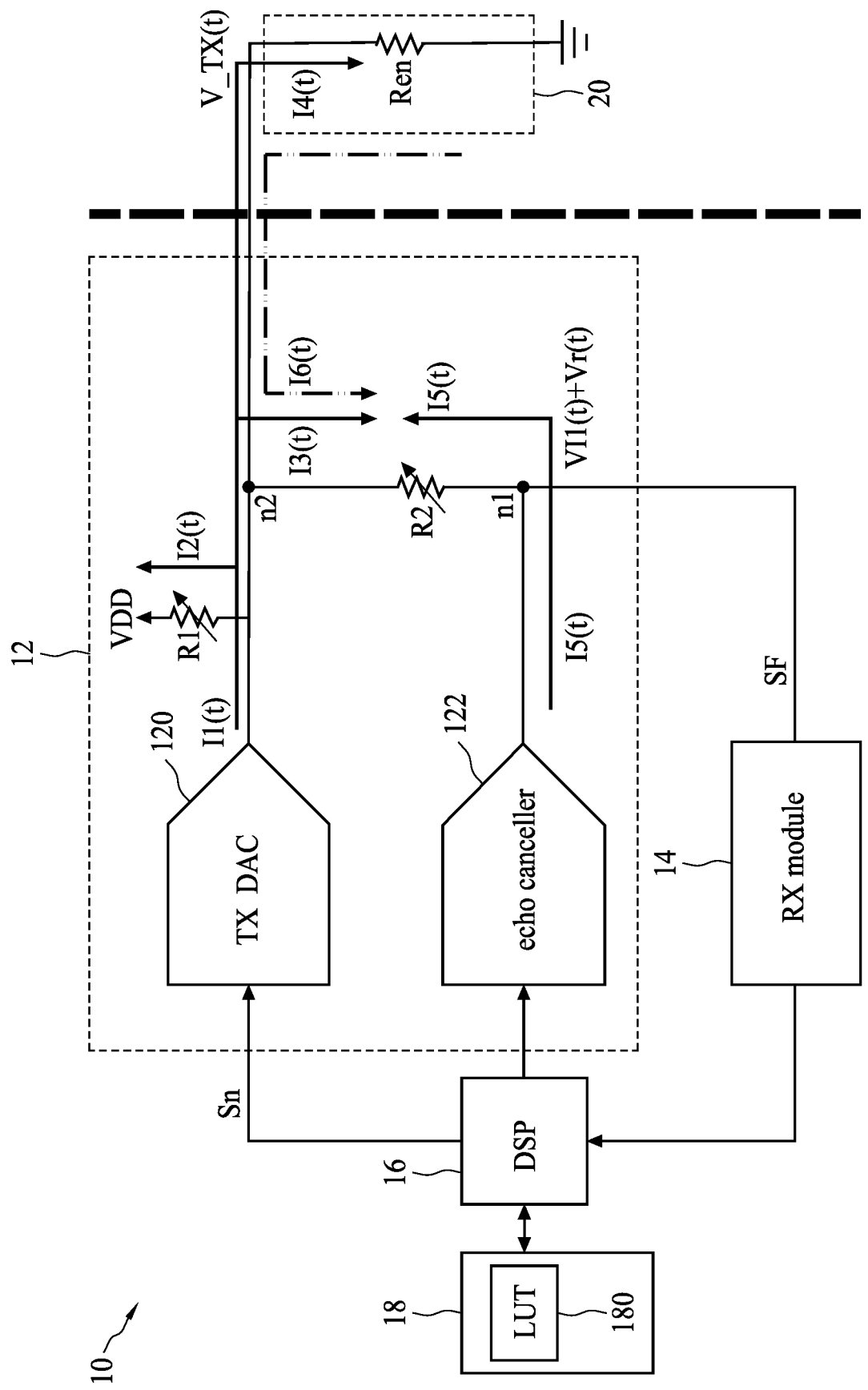
FIG. 1 is a circuit diagram of a transceiver according to embodiments of the present application.

FIG. 1 is a circuit diagram of a transceiver 10 according to embodiments of the present application. The transceiver 10 can be applied as a high-speed Ethernet device. Generally, the transceiver 10 is coupled to a transmission line 20, and coupled to another transceiver 10 through the transmission line 20. In some embodiments, the transmission line 20 includes a twist line. The transmission line 20 has a resistance value Ren. To facilitate the discussion, in a circuit analysis, the symbol "Ren" can refer to a resistance value or an equivalent resistor having the resistance value. In other words, the equivalent resistor Ren can be used to represent the transmission line 20.

Referring to FIG. 1, the transceiver 10 includes a transmitter module 12, a receiver module 14, a digital signal processor (DSP) 16 and a storage unit 18. The transmitter module 12 can be served as a transmitter section, whereas the receiver module 14 can be served as a receiver section.

The transmitter module 12 includes a transmitter digital-to-analog converter (DAC) 120 (labeled as TX DAC; hereinafter DAC 120) and a near-end echo canceller 122.

The DAC 120 has an output terminal coupled to a node n2, and functions to output an emission current by converting a near-end signal Sn into a current signal $I1(t)$ in an analog form (i.e., a near-end signal in the analog form). To facilitate the discussion, in the following discussion, the current signal $I1(t)$ represents the emission current. Specifically, the current signal $I1(t)$ is converted from a form of a current signal into a form of a voltage signal at least by a variable resistor R1 coupled to the output terminal of the DAC 120, so as to establish an output voltage signal V_TX(t). Accordingly, an amplitude of the output voltage signal V_TX(t) can be considered as a voltage across a variable resistor R1. The variable resistor R1 is coupled between the output terminal of the DAC 120 and a node of a supply voltage VDD. In a small signal analysis, the supply voltage VDD can be considered as a reference ground. In the following content, to facilitate the discussion, an amplitude of the output voltage signal V_TX(t) can be described as the output voltage V_TX.

The near-end echo canceller 122 and a variable resistor R2 (which can be referred to an echo-cancelling resistor) in combination eliminate a near-end echo, which will be described in detail below. The variable resistor R2 is coupled between an output terminal of the near-end echo canceller 122 and the transmission line 20. It should be noted that a near-end echo cannot be eliminate completely. In some embodiments, the near-end echo canceller 122 includes a DAC. In some embodiments, a circuit framework of the near-end echo canceller 122 implemented with a DAC is the same as the circuit framework of the TX DAC 120.

The receiver module 14 has an input terminal coupled to a node n1, and functions to convert a received analog signal into a digital signal, and then transmit the digital signal to the DSP 16. The received analog signal includes a far-end signal provided by the transmission line 20 and various echoes. In some embodiments, the receiver module 14 includes an analog front-end circuit (not shown) and an analog-to-digital converter (ADC) (not shown). The analog front-end circuit first processes the received analog signal, and then the ADC converts the received analog signal which has been processed into the digital signal. Then, the digital signal is sent to the DSP 16.

By way of a circuit architecture of the receiver module 14, a voltage level at the node n1 can be deemed as a reference ground in a small signal analysis, and can be kept stable in a direct current analysis. In a direct current analysis, a voltage level at the node n1 may be different from the supply voltage VDD. For example, the receiver module 14 includes an OP (operational amplifier)-based inverted closed loop amplifier. The operational amplifier has a non-inverted terminal coupled to a reference ground, and an inverted terminal coupled to the variable resistor R2 at the node n1. An output voltage of the operational amplifier is inversely proportional to a resistance value of the variable resistor R2. Due to a virtual short, in a direct current analysis, a voltage level of the inverted terminal of the operational amplifier is zero. That is, in the direct current analysis, a voltage level at the node n1 is zero. The above-mentioned circuit architecture is provided as an example, and the present disclosure is not limited thereto. Moreover, it should be noted that in the present disclosure, in a direct current analysis, a voltage level at the node n1 is designed in a particular way such that a voltage across the variable resistor R1 equals a voltage across the variable resistor R2. The purpose of such particular way is to achieve parallel connection between the variable resistors R1 and R2.

In summary, the transmitter module 12, the receiver module 14 and the transmission line 20 define a channel for a high-speed Ethernet. The channel performs functions of transmitting and receiving at the same time. Generally, a full-duplex communication system includes four channels.

As discussed above, the channel is used to perform transmission and receiving at the same time. In further detail, when the channel transmits a transmitted signal, the channel at the same time receives a received signal. The received signal would be interfered by the transmitted signal. Such phenomenon is called echo impairment. Specifically, in an ideal case, a transmitted signal transmitted by the transmitter module 12 is not coupled to the receiver module 14. However, in reality, the transmitted signal transmitted by the transmitter module 12 is inevitably coupled to the receiver module 14, directly or indirectly. Accordingly, the received signal received by the receiver module 14 includes not only the desired signal (e.g., a far-end signal) but also other signals that may cause interference. There are many sources of interference that may cause said interference. For example, in a possible interference, when the emission current is fed into the transmission line 20, a near-end echo is fed into the receiver module 14. In other words, a portion of the transmitted signal transmitted by the transmitter module 12 is coupled to the receiver module 14 via an electrical coupling inside the transceiver 10. The portion of the transmitted signal is called a near-end echo. In another possible case of interference, when the emission current is fed into the transmission line 20, a far-end echo is fed into the receiver module 14. In other words, after the transmitted signal transmitted by the transmitter module 12 enters the transmission line 20, another portion of the transmitted signal is reflected back to the receiver module 14 from the transmission line 20, thereby forming a far-end echo. Then, the far-end echo is fed into the receiver module 14. The present disclosures utilizes a far-end echo to achieve the technical effect of maintaining stabilization of the output voltage signal V_TX(t), which will be described in detail below. In summary, an echo includes a portion of the transmitted signal transmitted by the transmitter module 12. That is, the echo includes a portion of the current signal $I1(t)$.

Since there are many types of interference sources that may generate an echo, it is not feasible to increase complexity of circuits without any restrain in order to eliminate echoes generated by all sorts of interference sources. Nonetheless, at least by eliminating an echo generated because of an electrical coupling inside the transceiver 10 (hereinafter, an internal echo), overall impact resulting from echoes can be alleviated. One possible means is to effectively remove the internal echo by the near-end echo canceller 122 and the variable resistor R2.

In detail, the DAC 120 outputs the current signal $I1(t)$. The current signal $I1(t)$ is divided into current signals $I2(t)$, $I3(t)$ and $I4(t)$. The current signal $I2(t)$ flows into the supply voltage VDD through the variable resistor R1. The current signal $I3(t)$ is fed into the receiver module 14. That is, the current signal $I3(t)$ is deemed as a near-end echo. The current signal $I4(t)$ flows through the transmission line 20.

The current signal $I3(t)$ establishes a voltage signal $VI1(t)$ at the node n1 based on, such as, an input resistance of the receiver module 14. The voltage signal $VI1(t)$ can also be deemed as the near-end echo. To eliminate the near-end echo, the near-end echo canceller 122 provides a cancellation current. The cancellation current has a current signal $I5(t)$. An amplitude of the current signal $I5(t)$ is the same as an amplitude of the current signal $I3(t)$. Therefore, when the current signal $I5(t)$ flows into the variable resistor R2 in a direction opposite to a current direction of the current signal $I3(t)$, the current signal $I5(t)$ and the current signal $I3(t)$ counter cancel each other. Hence, the voltage signal $VI1(t)$ is zero, which means that the near-end echo has been eliminated.

In view of the foregoing, when the emission current is fed into the transmission line 20, the far-end echo is fed into the receiver module 14. The far-end echo has a current signal $I6(t)$. The current signal $I6(t)$ establishes a voltage signal Vr(t) at the node n1 based on, such as, an input resistance of the receiver module 14. The voltage signal Vr(t) can be deemed as an far-end echo SF reflected back to the receiver module 14 from the transmission line 20.

An amplitude of the far-end echo SF is associated with a relative value between the resistance value Ren of the transmission line 20 and an equivalent resistance value of the variable resistor set defined by variable resistors R1 and R2 connected in parallel. The relative value represents a level of an impedance matching. Put it simply, different levels of an impedance matching results in different amplitudes of the far-end echo SF. When an equivalent resistance value of the variable resistor set is the same as the resistance value Ren of the transmission line 20, a level of an impedance matching is the highest. Hence, an amplitude of the far-end echo SF is smallest.

On the other hand, an ideal resistance value Ren of the transmission line 20 is, for example, 50 ohms. During a circuit design stage, for the transmission line 20 of 50 ohms, an amplitude of the current signal I1(t) of the TX DAC 120 is properly designed such that the output voltage V_TX can meet a default value, wherein the output voltage V_TX is obtained based on a product of an amplitude of the current signal I4(t) and 50 ohms.

However, the actual resistance value Ren of the transmission line 20 may not be the ideal value of 50 ohms. In this case, if the DAC 120 still provides the current signal I4(t) based on 50 ohms, the output voltage V_TX can no longer meet the default value.

To obtain the output voltage V_TX satisfying the default value and to achieve the highest level of an impedance matching, a possible means is to measure the resistance value Ren of the transmission line 20. According to the measurement result, the DAC 120 provides an amplitude of the current signal I1(t) corresponding to the measured resistance value Ren (to facilitate the discussion, in the following description, an amplitude of the current signal can be referred to as a current value). In addition, the DAC 120 configures the variable resistors R1 and R2 according to the measurement result. However, this means requires an additional operation for measuring a resistance value, and hence, is not effective. Moreover, the current communication may have to be interrupted.

The present disclosure provides a corresponding current value of the current signal I1(t) and a corresponding resistance level of the variable resistor set by indirectly obtaining information on the resistance value Ren of the transmission line 20. As such, not only an output voltage V_TX satisfying a default value can be provided, and but also the highest level of an impedance matching can be reached.

The transceiver 10 has an evaluation operation and a normal operation. During the evaluation operation, the transceiver 10 evaluates a current value of the current signal I1(t) of the emission current and evaluates a resistance level of the variable resistor set. After the evaluation operation, during the normal operation, the transceiver 10 operates according to the evaluated current value and the evaluated resistance level.

As discussed above, a level of an impedance matching affects a level of an amplitude of the far-end echo SF. Therefore, it is possible to determine which of a plurality of default resistance levels the resistance value Ren of the transmission line 20 is close to by evaluating the amplitude of the far-end echo SF at each of the default resistance levels.

Further, the variable resistor set has a plurality of default resistance levels, as shown in Table 1 below. It should be noted that each value listed in Table 1 are provided for the purpose of illustration only. As could be appreciated, the variable resistors R1 and R2 are designed by the designer, and hence, a circuit designer can know an equivalent resistance value of the variable resistor set at each of the default resistance levels in advance. Information shown in Table 1 can be stored in for example, the storage unit 18.

TABLE 1

| Default resistance level | Variable resistor R1 (ohm) | Variable resistor R2 (ohm) | Equivalent resistance value of the variable resistor set (ohm) |
| --- | --- | --- | --- |
| LV1 | 60 | 300 | 50 |
| LV2 | 80 | 240 | 60 |

During the evaluation operation, the DSP 16 uses the default resistance level LV1 as an initial resistance level, and configures the variable resistors R1 and R2 according to the default resistance level LV1. Meanwhile, the DAC 120 outputs an emission current having an initial current value. The initial current value can be any of a plurality of default current values listed in Table 2. In this stage, the DSP 16 obtains information on an amplitude of the far-end echo SF. Next, the DSP 16 switches from the default resistance level LV1 into the default resistance level LV2. The DSP 16 configures the variable resistors R1 and R2 according to the default resistance level LV2. In this stage, the DSP 16 obtains information on an amplitude of the far-end echo SF. The DSP 16 evaluates the resistance value Ren of the transmission line 20 based on the information on the two aforesaid amplitudes.

For example, when an amplitude of the far-end echo SF at the default resistance level LV1 is smaller than an amplitude of the far-end echo SF at the resistance level LV2, the DSP 16 can evaluate that a resistance value Ren of the transmission line 20 is closer to an equivalent resistance value of the variable resistor set at the default resistance level LV1 than to an equivalent resistance value of the variable resistor set at the default resistance level LV2. In this way, the DSP 16 can know information on the resistance value Ren of the transmission line 20 indirectly without additional operations for measuring resistance.

To facilitate the discussion, in the following description, it is assumed that an amplitude of the far-end echo SF at the default resistance level LV1 is relatively small. Based on such premise, the variable resistors R1 and R2 are configured according to the default resistance level LV1.

After finishing the evaluation of a default resistance level of the variable resistor set, an amplitude of the far-end echo SF is ensured to be the smallest. Next, a current value of the current signal I1(t) is evaluated. The DSP 16 looks up a corresponding default current value in a lookup table (LUT) 180 stored in the storage unit 18 based on the evaluated default resistance level LV1.

In detail, the LUT 180 stores default current values of the current signal I1(t) at various default resistance levels. Table 2 summarizes a plurality of default current values. It should be noted that values listed in Table 2 are provided for illustration purpose only.

TABLE 2

| Default resistance level | Default current value (milliamp) |
| --- | --- |
| LV1 | 40 |
| LV2 | 33.3 |

As discussed above, in the foregoing evaluation of a default resistance level, the default resistance level LV1 has been evaluated. At the default resistance level LV1, an equivalent resistance value of the variable resistor set is 50 ohms (see, Table 1), which means that the predicted resistance value Ren of the transmission line 20 is 50 ohms.

Based on this circuit architecture, with respect to the DAC 120, the variable resistors R1 and R2 and the transmission line 20 are connected in parallel. As such, a default current value of 40 milliamps (see, Table 2) is equally divided between the variable resistor set and the transmission line 20. That is, the transmission line 20 is apportioned with a current of 20 milliamps. Accordingly, a voltage across the transmission line 20, i.e., an amplitude of the output voltage signal V_TX(t), is 1 volt (V).

After finishing the evaluation operation, the method proceeds to the normal operation. In the normal operation, the variable resistors R1 and R2 are configured according to the default resistance level LV1, and the TX DAC 120 provides a current signal I1(t) of 40 milliamps.

Alternatively, assuming that in the foregoing evaluation of a default resistance level, the default resistance level LV2 is evaluated. At the default resistance level LV2, an equivalent resistance value of the variable resistor set is 60 ohms (see, Table 1), which means that the predicted resistance value Ren of the transmission line 20 is 60 ohms. Based on this circuit architecture, with respect to the DAC 120, the variable resistors R1 and R2 and the transmission line 20 are connected in parallel. As such, a default current value of about 33.3 milliamps (see, Table 2) is evenly apportioned between the variable resistor set and the transmission line 20. In other words, the transmission line 20 is apportioned with a current of about 16.65 milliamps. Accordingly, a voltage across the transmission line 20, i.e., the output voltage V_TX, is about 1 V.

After finishing the evaluation operation, the method proceeds to the normal operation. In the normal operation, the variable resistors R1 and R2 are configured according to the default resistance level LV2, and the DAC 120 provides a current signal I1(t) of 33.3 milliamps.

In summary, a voltage across the transmission line 20 can be maintained at 1 V or within an acceptable error range, no matter that in the evaluation operation the default resistance level LV1 or LV2 is evaluated. Furthermore, even though the resistance value Ren of the transmission line 20 is not the ideal value of 50 ohms, it is feasible to keep an amplitude of the far-end echo SF as small as possible. In the meantime, it is feasible to keep the output voltage signal V_TX(t) at a fixed value or within an acceptable error range.

In some embodiments, at various default resistance levels, a resistance value ratio of the variable resistor R1 to the variable resistor R2 is kept the same. In further detail, a default resistance level, a resistance value of the variable resistors R1 and R2, and an equivalent resistance value of the variable resistor set are summarized in Table 3 below. It should be noted that values listed in Table 3 are for the purpose illustration only. As could be appreciated, the present disclosure is not limited to keeping a resistance value ratio the same at various default resistance levels. In other embodiments, at various default resistance levels, a resistance value ratio of the variable resistor R1 to the variable resistor R2 may be different.

TABLE 3

| Default resistance level | Variable resistor R1 (ohm) | Variable resistor R2 (ohm) | Equivalent resistance value of variable resistor set (ohm) |
| --- | --- | --- | --- |
| LV1 | 60 | 300 | 50 |
| LV2 | 72 | 360 | 60 |

In the embodiment of Table 3, at the default resistance levels LV1 and LV2, a resistance value ratio of the variable resistor R1 to the variable resistor R2 is kept at 1:5. Accordingly, at the default resistance levels LV1 and LV2, a ratio of a current value of the current signal I2(t) to a current value of the current signal I3(t) is kept at 5:1.

Also, to satisfy a condition of an impedance matching, a resistance value ratio of an equivalent resistance value of the variable resistor set to the resistance value Ren of the transmission line 20 is 1:1. Accordingly, a ratio of a total current value of the current signal I2(t) and current signal I3(t) to a current value of the current signal I4(t) is 1:1.

Moreover, a current value of the current signal I5(t) provided by the near-end echo canceller 122 is designed to be the same as a current value of the current signal I3(t). Accordingly, a ratio of a current value of the current signal I2(t) to a current value of the current signal I5(t) is kept at 5:1. In summary ratio among the current values of the current signals I1(t), I2(t), I3(t), I4(t) and I5(t) can be expressed as the following:

I1(t):I2(t):I3(t):I4(t):I5(t)=12:5:1:6:1

Briefly, a ratio of the current values of the current signal I1(t) to I5(t) is 12:1. Accordingly, the near-end echo canceller 122 can be designed to have the same circuit architecture as that of the DAC 120, except that a current value of the current signal I5(t) provided by the near-end echo canceller 122 is one-twelfth to a current value of the current signal I1(t) provided by the DAC 120. Hence, design of the near-end echo canceller 122 can be simplified.

Figure 2:
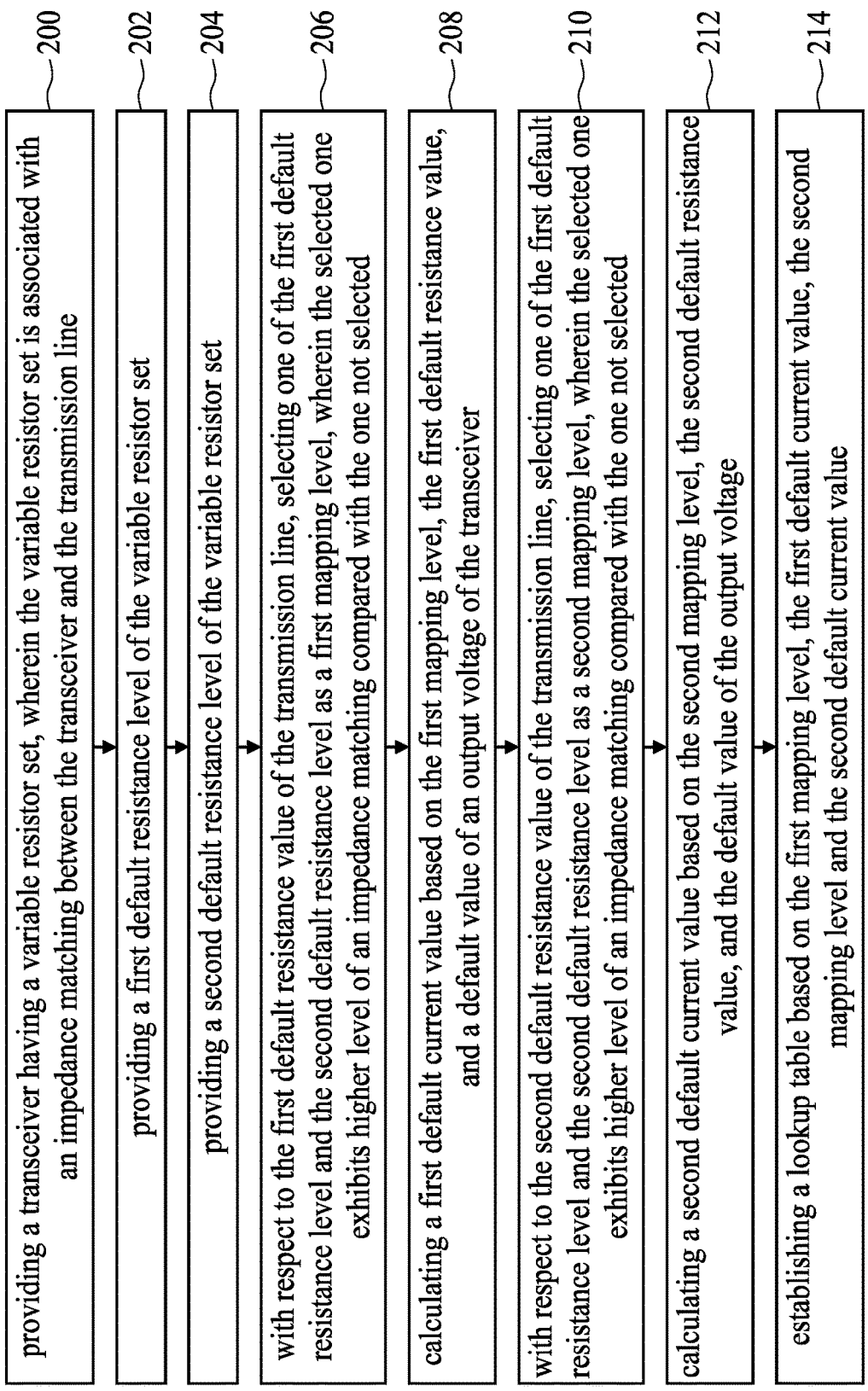
FIG. 2 is a flow chart illustrating a method for establishing a lookup table in FIG. 1.

FIG. 2 is a flow chart of a method 25 for generating the lookup table 180 in FIG. 1. Referring to FIG. 2, the method 25 is carried out before the transmitter 10 is delivered from a factory. The method 25 includes operations 200, 202, 204, 206, 208, 210, 212 and 214. In operation 200, a transceiver 10 having a variable resistor set is provided. The variable resistor set is associated with an impedance matching between the transceiver 10 and the transmission line 20. In operation 202, a first default resistance level LV1 of the variable resistor set is provided. In operation 204, a second default resistance level LV2 of the variable resistor set is provided.

In operation 206, the transmission line 20 having a first default resistance value is being connected to the transceiver 10. The first default resistance value is known, for example, 50 ohms. It should be noted that the first default resistance value in the present embodiment is the same as an equivalent resistance value of the variable resistor set at the first default resistance level LV1. However, the present disclosure is not limited thereto.

The DSP 16 configures the variable resistor set according to the first default resistance level LV1, and obtains information on an amplitude of the far-end echo SF at the first default resistance level LV1. Next, the DSP 16 configures the variable resistor set according to the second default resistance level LV2, and obtains information on an amplitude of the far-end echo SF at the second default resistance level LV2.

With respect to the first default resistance value of the transmission line 20, one of the first default resistance level LV1 and the second default resistance level LV2 is selected as a first mapping level. The selected one exhibits higher level of an impedance matching, compared with the one not selected. For example, the first default resistance value is 50 ohms. Hence, compared with the second default resistance level LV2, an amplitude of the far-end echo SF at the first default resistance level LV1 is smaller, thereby exhibiting a relatively high level of an impedance matching. Therefore, the first default resistance level LV1 is selected as the first mapping level.

In operation 208, a first default current value is calculated based on the first mapping level, the first default resistance value, and a default value of an output voltage V_TX of the transceiver 10. For example, the variable resistors R1 and R2 and the transmission line 20 are connected in parallel. An equivalent resistance value of the variable resistors R1 and R2 and the transmission line 20 connected in parallel at the first default resistance level LV1 is 25 ohms. The default value of the output voltage V_TX is 1 V. According to Ohm's Law, the first default current value is calculated as 40 milliamps. Next, the transmission line 20 having the first default resistance value is disconnected from the transceiver 10.

In operation 210, the transmission line 20 having a second default resistance value is being connected to the transceiver 10. The second default resistance value is known; for example, 60 ohms. It should be noted that in the present embodiment, the second default resistance value is the same as an equivalent resistance value of the variable resistor set at the second default resistance level LV2. However, the present disclosure is not limited thereto.

The DSP 16 configures the variable resistor set according to the first default resistance level LV1 and obtains information on an amplitude of the far-end echo SF at the first default resistance level LV1. Next, the DSP 16 configures the variable resistor set according to the second default resistance level LV2 and obtains information on an amplitude of the far-end echo SF at the second default resistance level LV2.

With respect to the second default resistance value of the transmission line 20, one of the first default resistance level LV1 and the second default resistance level LV2 is selected as a second mapping level. The selected one exhibits a relatively high level of impedance matching, compared with the one not selected. For example, the second default resistance value is 60 ohms. Hence, compared with the first default resistance level LV1, an amplitude of the far-end echo SF at the second default resistance level LV2 is smaller, thereby exhibiting a higher level of an impedance matching. Therefore, the second default resistance level LV2 is selected as the second mapping level.

In operation 212, a second default current value is calculated based on the second mapping level, the second default resistance value and a default value of an output voltage V_TX of the transceiver 10. For example, the variable resistors R1 and R2 and the transmission line 20 are connected in parallel. An equivalent resistance value of the resistors R1 and R2 and the transmission line 20 connected in parallel at the second default resistance level LV2 is 30 ohms. The default value of the output voltage V_TX is 1 V. According to Ohm's Law, the second default current value is calculated as 30 milliamps.

In operation 214, a lookup table 180 is established based on the first mapping level, the first default current value, the second mapping level and the second default current value, as shown in Table 2.

The foregoing outlines a portion of embodiments of the present disclosure, and shall not be used to limit the present application; any modification, equivalent substitution or improvement made within the spirits and principles of the present application shall be included in the scope of protection of the present application.

What is claimed is:

1. A transceiver, coupled to a transmission line, the transceiver comprising:
a variable resistor set;
a transmitter module, having an output terminal coupled to the variable resistor set and the transmission line, the transmitter module comprising:
a digital-to-analog converter configured to output an emission current;
a receiver module, having an input terminal coupled to the transmitter module and the transmission line, wherein when the emission current is fed into the transmission line, a far-end echo is fed into the receiver module, an amplitude of the far-end echo is associated with a resistance value of the transmission line; and
a digital signal processor, coupled to the transmitter module and the receiver module, wherein the digital signal processor adjusts a current value of the emission current from a first default current value to a second default current value based on the amplitude of the far-end echo,
wherein the digital signal processor adjusts a resistance level of the variable resistor set from a first default resistance level to a second default resistance level according to the amplitude of the far-end echo, so as to adjust the current value of the emission current from the first default current value to the second default current value, correspondingly.

2. The transceiver of claim 1, wherein the transceiver further comprises:
a storage unit, configured to store a lookup table, the lookup table including the first default resistance level, the second default resistance level, the first default current value corresponding to the first default resistance level, and the second default current value corresponding to the second default resistance level, wherein a product of the first default current value and an equivalent resistance value of the variable resistor set operating at the first default resistance level equals a product of the second default current value and an equivalent resistance value of the variable resistor set operating at the second default resistance level.

3. The transceiver of claim 2, wherein an amplitude of the far-end echo corresponding to a resistance value of the variable resistor set which is configured according to the second default resistance level is smaller than an amplitude of the far-end echo corresponding to a resistance value of the variable resistor set which is configured according to the first default resistance level.

4. The transceiver of claim 3, wherein the variable resistor set comprises a first variable resistor and a second variable resistor that are equivalently connected in parallel.

5. The transceiver of claim 4, wherein an output voltage of the transceiver is associated with an equivalent resistance value of the first variable resistor, the second variable resistor and the transmission line that are connected in parallel.

6. The transceiver of claim 4, wherein the input terminal of the receiver module is coupled to a first node, the output terminal of the transmitter module is coupled to a second node, the transmission line is coupled to the second node, the first variable resistor is coupled between the second node and a node providing a supply voltage, and the second variable resistor is coupled between the first node and the second node.

7. The transceiver of claim 6, wherein the transmitter module further comprises:
a near-end echo canceller, coupled to the first node.

8. The transceiver of claim 7, wherein when the emission current is fed into the transmission line, a near-end echo is caused and further fed into the receiver module, and the near-end echo canceller reduces the near-end echo by providing a cancellation current.

9. The transceiver of claim 8, wherein a resistance value ratio of the first variable resistor and the second variable resistor that are configured according to the first default resistance level equals a resistance value ratio of the first variable resistor and the second variable resistor that are configured according to the second default resistance level.

10. The transceiver of claim 9, wherein a ratio, in a circumstance that the first variable resistor and the second variable resistor are configured according to the first default resistance level, of a current value of the cancellation current to the first default current value equals a ratio, in a circumstance that the first variable resistor and the second variable resistor are configured according to the second default resistance level, of a current value of the cancellation current to the second default current value.

11. A method for operating a transceiver, the method comprising:
outputting an emission current from a digital-to-analog converter, wherein when the emission current is fed into a transmission line coupled to the transceiver, a far-end echo is caused and fed into a receiver module of the transceiver, and an amplitude of the far-end echo is associated with a resistance value of the transmission line; and
adjusting a current value of the emission current from a first default current value to a second default current value based on the amplitude of the far-end echo, including:
adjusting a resistance level of a variable resistor set of the transceiver from a first default resistance level to a second default resistance level according to the amplitude of the far-end echo, so as to adjust the current value of the emission current from the first default current value to the second default current value, correspondingly.

12. The method of claim 11,
wherein a lookup table includes the first default resistance level, the second default resistance level, the first default current value corresponding to the first default resistance level, and the second default current value corresponding to the second default resistance level, wherein a product of the first default current value and an equivalent resistance value of the variable resistor set operating at the first default resistance level equals a product of the second default current value and an equivalent resistance value of the variable resistor set operating at the second default resistance level.

13. The method of claim 12, wherein an amplitude of the far-end echo corresponding to a resistance value of the variable resistor set which is configured according to the second default resistance level is smaller than an amplitude of the far-end echo corresponding to a resistance value of the variable resistor set which is configured according to the first default resistance level.

14. The method of claim 13, comprising:
connecting a first variable resistor and a second variable resistor in parallel to form the variable resistor set.

15. The method of claim 14, wherein an output voltage of the transceiver is associated with an equivalent resistance value of the first variable resistor, the second variable resistor and the transmission line that are connected in parallel.

16. The method of claim 14, comprising:
coupling an input terminal of the receiver module to a first node;
coupling an output terminal of the transmitter module to a second node;
coupling the transmission line to the second node;
coupling the first variable resistor between the second node and a node providing a supply voltage; and
coupling the second variable resistor between the first node and the second node.

17. The method of claim 16, further comprising:
coupling a near-end echo canceller to the first node.

18. The method of claim 17, wherein when the emission current is caused and fed into the transmission line, a near-end echo is further fed into the receiver module, and the method further comprises:
providing a cancellation current by the near-end echo canceller to reduce the near-end echo.

19. The method of claim 18, wherein a resistance value ratio of the first variable resistor and the second variable resistor that are configured according to the first default resistance level equals a resistance value ratio of the first variable resistor and the second variable resistor that are configured according to the second default resistance level.

20. The method of claim 19, wherein a ratio, in a circumstance that the first variable resistor and the second variable resistor are configured according to the first default resistance level, of a current value of the cancellation current to the first default current value equals a ratio, in a circumstance that the first variable resistor and the second variable resistor are configured according to the second default resistance level, of a current value of the cancellation current to the second default current value.

* * * * *